Aug. 16, 1955  H. N. RIDGWAY  2,715,342
TANDEM ATTACHMENT FOR BICYCLES
Filed Sept. 4, 1952  2 Sheets-Sheet 1

INVENTOR.
Herbert N Ridgway
BY
Louis C. Smith
Attorney.

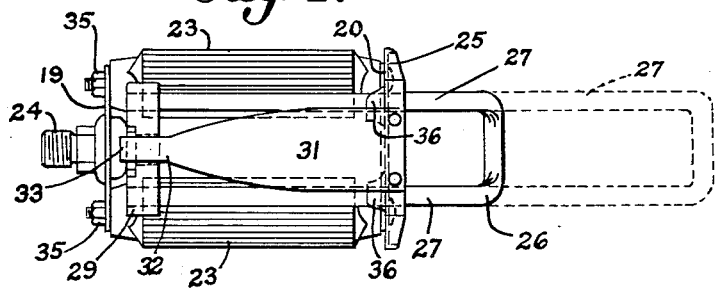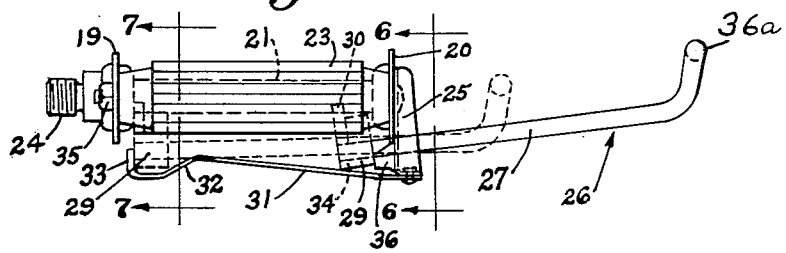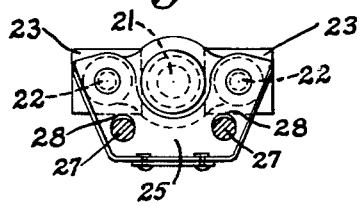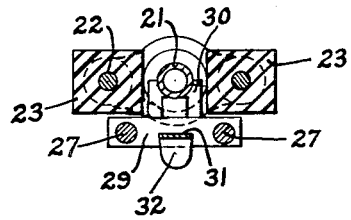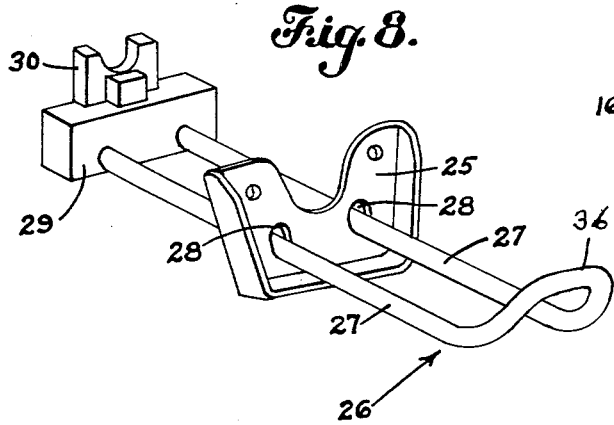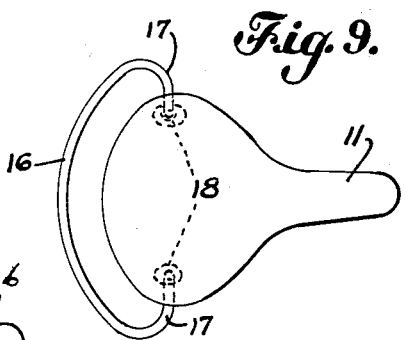
INVENTOR.
Herbert N Ridgway
BY Louis C. Smith
Attorney

2,715,342

TANDEM ATTACHMENT FOR BICYCLES

Herbert N. Ridgway, Winthrop, Mass.

Application September 4, 1952, Serial No. 307,799

4 Claims. (Cl. 74—594.7)

This invention relates to bicycles, and especially to a tandem attachment which can be secured to any standard bicycle having a single seat to convert it into a bicycle having two seats situated one in front of the other, together with provision for the occupants of both seats to participate in the pedaling operation.

One object of the invention is to provide a novel tandem attachment of the above type which is simple in construction and inexpensive to manufacture, and which can be applied to any standard make of bicycle regardless of the design of the bicycle frame.

A further object of the invention is to provide a tandem attachment for bicycles which includes an extensible and contractable pedal extension which can be readily mounted on each of the main pedals without making any change therein and which when extended provides a pedal member for use of the rider on the rear seat. A still further object of the invention is to provide such pedal extension which is so constructed that in its extended operative position it is inclined upwardly and outwardly, thereby to provide sufficient clearance so that the extended pedal will not strike the ground when the bicycle is rounding a corner.

A further object of the invention is to provide an improved tandem attachment for bicycles which embodies the improved device hereinafter set forth.

In the drawings wherein I have illustrated a selected embodiment of the invention:

Fig. 4 is a bottom plan view of one of the pedals showing in full lines the pedal extension in retracted position, the dotted lines position showing the extension in its extended position.

Fig. 5 is a side view of the pedal shown in Fig. 4.

Fig. 6 is a section on the line 6—6, Fig. 5.

Fig. 7 is a section on the line 7—7, Fig. 5.

Fig. 8 is a view of the pedal extension removed from the main pedal.

Fig. 9 is a plan view of the front saddle showing the hand-grip for the occupant of the back seat.

Figure 1:
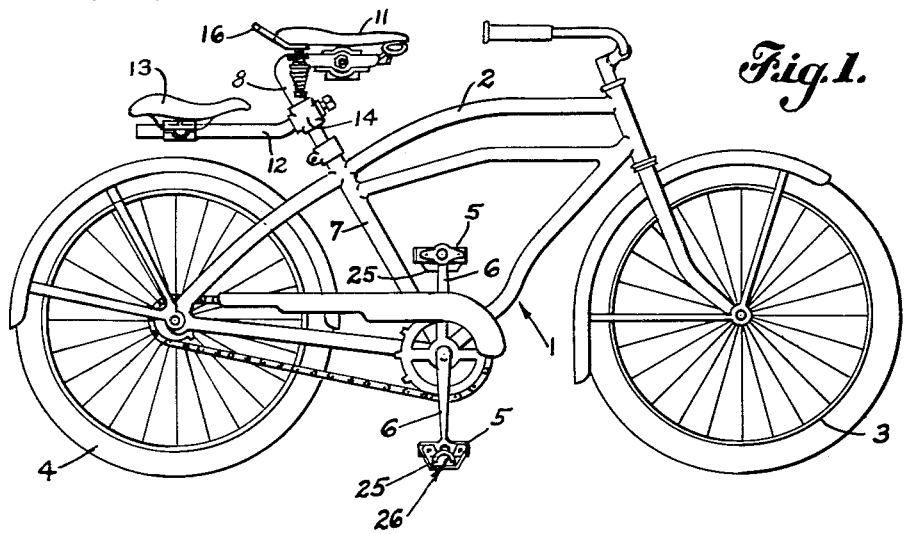
Fig. 1 is a side view of a bicycle having the tandem attachment applied thereto.
Figure 2:
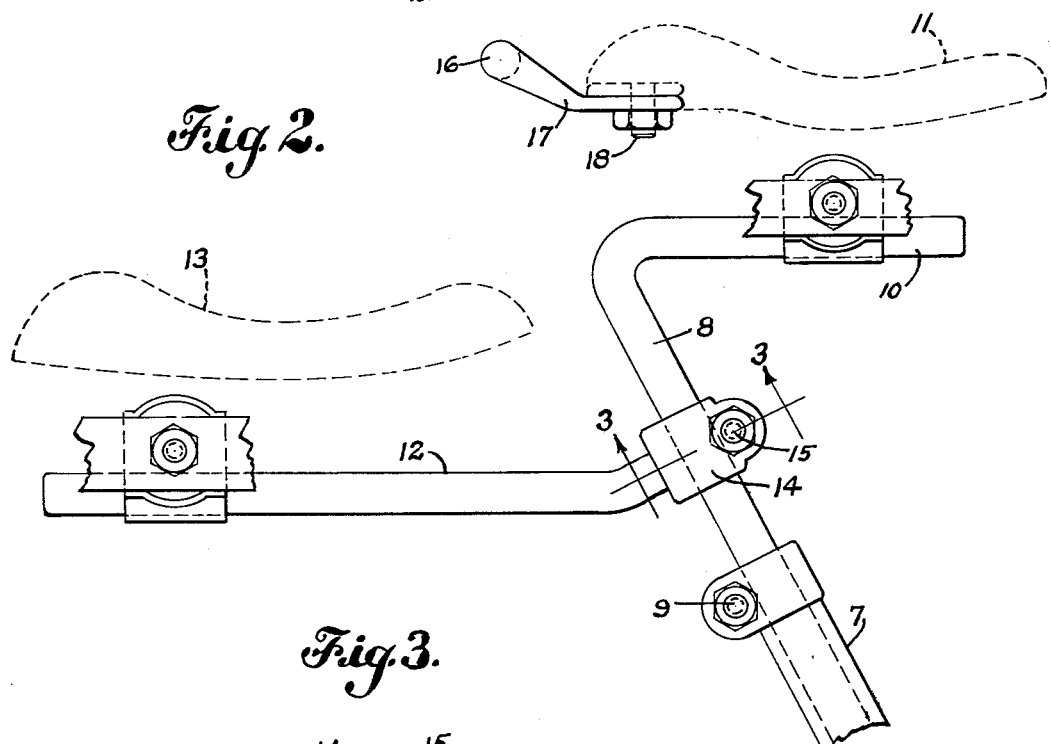
Fig. 2 is an enlarged fragmentary view illustrating the novel seat post which forms part of the attachment and on which both seats are mounted.
Figure 3:
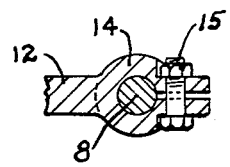
Fig. 3 is a section on the line 3—3, Fig. 2.

In the drawings 1 indicates a bicycle of any usual construction having a frame 2 of some standard construction and provided with the usual front wheel 3 and rear wheel 4, and also with pedals 5 which are carried by the crank arms 6 and by which the bicycle is propelled.

The frame 2 is formed with the usual seat post supporting member 7 on which is mounted the seat post for carrying the saddle.

In accordance with my invention, the seat post is designed to carry not only the usual saddle but also to carry an extra saddle in the rear of the regular saddle for use of the second person riding the bicycle. The seat post herein illustrated is indicated at 8, and it has the main stem which fits into the upper end of the seat post supporting member 7, the latter being provided with a clamping device 9 of any usual construction by which the seat post can be held in different vertical positions. The improved seat post 8 is formed at its upper end with a forwardly extending arm 10 adapted to receive the regular seat or saddle 11, said seat being mounted on the arm and clamped thereto in any usual manner.

The improved seat post 8 is also provided with a second seat-supporting arm 12 which extends rearwardly and which is adapted to receive and support a second saddle 13 which is located directly behind the main or principal saddle 11. The arm 12 is mounted on the seat post 8 for vertical adjustment so as to provide for raising and lowering the rear seat 13 to accommodate the leg length of the rear rider. As herein shown, the arm 12 carries at its forward end a split hub 14 which embraces the seat post 8 and which is clamped thereto in any adjusted position by means of a clamping bolt 15.

The two seats 11 and 13 are, therefore, adjustable vertically independently of each other, the front seat 11 being adjusted vertically by sliding the post 8 up or down in the post-supporting member 7, and the rear seat 13 being adjusted vertically by moving the clamping hub 14 up and down on the post 8.

The operation of adding a second seat to the bicycle involves merely discarding the original seat post designed to support a single seat and replacing it with a seat post such as herein shown which is made of some suitable metal strong enough to support the weight of two riders and which has both the forwardly extending arm 10 and the rearwardly extending arm 12. The making of this change does not involve any change in or addition to the bicycle frame.

The front seat 11 is preferably provided with a rearwardly extending hand-grip 16 which can be used by the occupant of the rear seat 13 for steadying himself while the bicycle is in motion. This hand-grip is shown as a rod or tube which preferably has an outwardly curved contour and the ends 17 of which are bent inwardly and are attached to the under side of the seat 11 by means of attaching bolts 18. This makes a relatively wide hand-grip which can be grasped by the back seat rider while his hands are well spread apart.

The attachment also includes a novel pedal extension mounted on each pedal 5 and which is extensible and retractable in the direction of the axis of the pedal, said pedal extensions when in their extended positions providing pedal members for the use of the occupant of the rear seat, and by which he can assist in the pedaling operation.

The main pedals 5 may be of any suitable or usual construction, and each is shown as embodying a frame comprising an inner end member 19 and an outer end member 20 which are connected by a hub member 21 and by rods 22 on which the treads 23 are mounted. The hub member 21 is tubular and receives the usual spindle on which the pedal is mounted, the inner end 24 of which is screw threaded for attaching it to the crank arms 6, as is usual in bicycle construction.

The pedal extension embodying my invention is so constructed that it can be easily attached to the main pedal 5 without making any change therein, and can be as easily removed therefrom, thereby leaving the main pedal in its original condition. Said pedal extension comprises a plate member 25 which is mounted on the bolts 22 at the outer face of the outer head 20 and extends below said head, and also includes a U-shaped pedal member 26, the arms 27 of which extend through openings 28 in the plate 25 and are connected at their inner end by a head or cross-bar 29 situated beneath the treads 23. This cross-bar or head 29 has a guiding member 30 rising therefrom which is situated between the treads 23, and the upper edge of which has a concave contour to fit against the under side of the pedal hub 21, as shown in Fig. 7.

When the extensible pedal is in its retracted position shown in full lines Fig. 4, the cross-bar 29 is located at the inner end of the pedal, as shown in Fig. 4, and the end 26 of the extensible pedal extends slightly beyond the plate 25. The extensible pedal member can be extended by merely moving it toward the right in Fig. 4 so as to bring the head or cross-bar 29 to the outer end of the main pedal adjacent the outer end member 20 and against the stop projection 36 carried by the lower depending portion of the plate 25, as illustrated in full lines, Fig. 5, said plate thus constituting a stop to limit the outward movement of the pedal extension. The openings 28 through which the arms 27 of the pedal extension pass are so located that as the pedal extension is moved from its retracted position into its extended position with the guiding member in contact with the hub 21, said pedal extension will be given an upwardly inclined position, as seen in Fig. 5, wherein the outer end of said pedal extension is at a higher level than the bottom of the main pedal 5. During the extending movement of the pedal extension, the guiding member 30 rides along on the under side of the hub 21 and, as stated above, the openings 28 are so positioned that as the arms 27 slide along the lower walls of said openings during the extending movement, the outer end of the extension will be moved upwardly so that in its operative position it is inclined outwardly and upwardly from the main pedal. This result is secured by reason of the fact that the holes 28 in the plate 25 are located a less distance below the axis of the hub 21 than the point at which the arms 27 of the pedal extension are secured to the crosshead 29 and are large enough to permit said arms to have a slight tilting action during the outward extending movement thereof.

This construction has the important advantage that when the pedal extension is in its operative position the end thereof is located well above the bottom of the main pedal, and hence there is sufficient clearance space between the end of the pedal extension and the road surface to enable the bicycle to round a corner without danger of the pedal extension striking the road surface.

Means are provided for yieldingly holding the pedal extension in either its retracted position shown in full lines, Fig. 4, or its extended position shown in full lines, Fig. 5. For this purpose there is provided a leaf spring member 31 which is secured to the lower edge of the plate 25 and is formed at its inner end with the upwardly bent portion 32 adapted to engage the cross member 25 when the extension is in its retracted position, thereby yieldingly holding said extension in such position. The end of the spring 31 is shown as provided with a lip 33 which engages the inner face of the cross-bar 29 when the pedal extension is in its retracted position. The spring 31 permits the pedal extension to be readily moved from its retracted position into its extended position, and when in its extended position said spring engages yieldingly the lower inner corner 34 of the cross-bar 29, and thus yieldingly holds said pedal extension in its extended position.

The pedal extension is held yieldingly in each position and can be shifted from the retracted to the extended operative position, or vice versa, by merely applying a slight pressure to the end thereof. No tools are necessary to make this shift of position in the pedal extension.

The outer end 36a of the pedal extension is preferably bent upwardly so that when it is being used the foot of the person riding on the back seat 13 will be retained on the pedal and will be prevented from slipping off the end thereof.

Another advantage of the pedal construction herein shown is that the center of gravity of the pedal extension is below the axis of the pedal 5, and hence the pedal will be normally held in a horizontal position, which is a convenience for the bicycle rider when mounting or dismounting.

The pedal extension can be mounted on the pedal by simply removing the bolts 22 and, after placing the plate 25 in proper position relative to the end plate 20 of the pedal frame, reinserting the bolts through both the plate 25 and the end members 19, 20 of the pedal frame. It is understood that these bolts have screw-threaded ends to receive nuts 35.

The improved pedal attachment as sold to a customer would include the seat post having the rearwardly extending arm 12, a saddle 11 equipped with the handgrip 16 as shown in Fig. 9, and two pedal extension members, shown in Fig. 8, the seat post preferably being made of some extra strong steel to enable it to support the weight of the two persons.

In applying the attachment to a single seat bicycle, the seat of said bicycle will be removed from the postsupporting member 7. The seat forming the part of the attachment will then be mounted on the post-supporting member 7 of the bicycle frame, and the regular seat with which the bicycle was originally equipped will be applied to the rearwardly extending arm 12, thereby becoming the rear seat of the tandem attachment. The seat equipped with the hand-grip 16 which will be sold to the customer as part of the attachment is then applied to the forwardly extending arm 10 of the seat post. The pedal extension can be quickly and easily applied to each pedal by removing the bolts 22 and assembling the plate 25 of the pedal attachment with the end plate 20 of the pedal frame, and then replacing the bolts 22.

It will be noted that the installation of the attachment embodying the invention requires no change whatever either in the bicycle frame or in the pedals 5, and hence the device is adapted for application to any standard bicycle regardless of the design of the frame or the construction of the pedal.

I claim:

1. An extensible bicycle pedal for a bicycle having tandem seats, said pedal comprising a main pedal member having a frame presenting inner and outer end members connected by a hub member adapted to be pivotally mounted on a crank arm spindle of the bicycle, treadcarrying rods extending from one end member to the other, main tread elements mounted on said rods, a plate mounted on said rods outside of the outer end member and extending below the latter, said plate having two openings located below said outer end member, an auxiliary extensible tread member presenting a U-shaped body, the arms of which extend through said openings, a cross-bar rigidly connecting the inner ends of said arms and located beneath the main tread elements, said auxiliary tread member being adjustable between an inoperative retracted position in which the major portion thereof is located directly below the main treads, and an extended operative position in which it is projected beyond the main treads sufficiently to provide foot room for a second rider of the bicycle, said cross-bar having sliding engagement with the hub member during such adjusting movement and cooperating with said plate to limit outward movement of the auxiliary treadle member.

2. An extensible bicycle pedal as defined in claim 1 in which the cross-bar has an upwardly extending guiding portion which has a sliding engagement with and partially embraces the hub member thereby guiding the inner end of the auxiliary treadle member during its adjusting movement.

3. An extensible bicycle pedal as defined in claim 1 and which includes a leaf spring member carried by the plate and having yielding engagement with the under side of the cross-bar and operative to yieldingly hold it in either its retracted or its extended position.

4. An extensible bicycle pedal as defined in claim 1, in which the openings through the plate are situated at a less distance below the axis of the hub element than the point at which the arms of the auxiliary pedal are secured to the cross-head, whereby when the auxiliary pedal is extended it has an upwardly inclined position.

References Cited in the file of this patent

UNITED STATES PATENTS

| Number | Name | Date |
|---|---|---|
| 34,063 | Landis | Jan. 7, 1862 |
| 287,943 | Kennedy | Nov. 6, 1883 |
| 2,337,246 | Kelly | Dec. 21, 1943 |
| 2,361,708 | Raba | Oct. 31, 1944 |

FOREIGN PATENTS

| Number | Country | Date |
|---|---|---|
| 274,295 | Great Britain | July 21, 1927 |
| 941,771 | France | Aug. 23, 1948 |